Patented Jan. 9, 1940

2,186,598

UNITED STATES PATENT OFFICE 2,186,598

STABILIZED POLYVINYL ACETALS

Gustave Bryant Bachman, Rochester, N. Y., assignor to Eastman Kodak Company, Rochester, N. Y., a corporation of New Jersey No Drawing. Application October 6, 1937, Serial No. 167,621

20 Claims. (Cl. 260—73)

This invention relates to the preparation of a stable polyvinyl acetal resin by carrying out its preparation in the presence of an aldehyde in which the aldehyde group is attached to a compound having stabilizing properties such as an amino benzaldehyde, a dihydroxy aromatic aldehyde in which not more than one hydroxyl has an alkyl group replacing the hydrogen, or a compound which generates such a dihydroxy aromatic aldehyde in the reaction mixture, such as an alkylene dioxy aromatic aldehyde.

The instability of polyvinyl acetal resins has been a problem in the art of making and using that type of resin. For instance, a product can be made therefrom and some time later the product might be dark and degraded, thus terminating its commercial usefulness.

One object of my invention is to prepare polyvinyl acetal resins which do not exhibit a tendency to degrade upon ageing or darken when heated. Another object of my invention is to render polyvinyl acetal resins stable so that they may be employed for use in making commercial products whose life is not shortened by the breakdown of the resin which might occur without a stabilization treatment such as in accordance with my invention.

The instability of polyvinyl acetal resins may be manifested in various ways, such as by the brittleness and increased color of an aged film of the resin. This characteristic is, of course, very detrimental in most cases where a resin film may be employed.

In the laboratory the amount of stability is determined by subjecting the product to an elevated temperature for a prescribed period of time. One method of determining the stability is by heating a sample of the resin to a temperature of about 180° C. in a stream of nitrogen and measuring the decomposition products formed. These products are formed by passing the gases given off over heated copper oxide which oxidizes these gases to carbon dioxide and water, whereupon the carbon dioxide gas is cooled and weighed.

The preferred method of ascertaining stability is to heat a sample of the resin at about 110° C. for 24 hours and then measure the loss of viscosity of a 5% solution of the resin in acetic acid. The viscosity may be determined in any customary manner, such as by the use of a viscosimeter. In this test a polyvinyl acetal resin, which has not been stabilized, shows a decided drop in viscosity. The following data illustrates the drop in viscosity upon heating:

|  | Original viscosity | Viscosity after heating for 24 hours at 110° C. |
|---|---|---|
|  | Centipoises | Centipoises |
| Polyvinyl acetal resins which were not stabilized | 209 | 15 |
|  | 199 | 11 |
|  | 102 | 23 |

I have found that by carrying out the preparation of the polyvinyl acetal resin in which a small amount of a dihydroxy aromatic aldehyde, such as referred to above, is present, a stable polyvinyl acetal resin is obtained. I have found that by having such an aldehyde present, the stabilizing material incorporates itself chemically into the polyvinyl acetal resin and is thereby permanently fixed therein. I have found that polyvinyl acetal resins, which I prepare, contain groups from the stabilizing aldehydes which are present in the reaction mixture as well as from the other aldehydes employed therein. I have found that the polyvinyl acetal resins, which have been stabilized by my invention, can be employed to prepare commercial products without any darkening or degradation occurring in use. These stabilized acetal resins are particularly adapted for use in the fine arts, such as in the making of photographic film.

The dihydroxy aromatic aldehydes, which I may employ, are those in which not more than one of the hydroxyl groups has been etherified or else in which, if both of the hydroxy compounds have been etherified, the compound is of the type in which the etherification on at least one of the oxygens is broken down in the reaction mixture so that a dihydroxy aromatic aldehyde, having at least one free hydroxyl group, is generated in the reaction. It is not necessary in the aldehydes, which I employ, that the aldehyde group be directly connected to the benzene ring. For instance, an alkyl group can be joined to the benzene ring and the aldehyde group may be attached thereto. Some of the dihydroxy aromatic aldehydes, which may be employed in accordance with my invention, are, gentisinic aldehyde, protocatechuic aldehyde, resorcyl aldehyde or vanillin. Some of the amino benzaldehydes which I may employ are p-dimethyl amino-benzaldehyde, amino benzaldehyde and monomethylamine benzaldehyde. Some of the compounds which break down into suitable aldehydes in the reaction mixture are, piperonal and 3,4 methylenedioxy-dihydroatropic aldehyde. The compounds which do break down into the type of aldehydes, which are suitable for use in the reaction mixture, are generally classified as alkylene dioxy-aromatic aldehydes and particularly the ortho alkylene dioxy-aromatic aldehydes. Due to their availability at the present time, it appears that vanillin or piperonal will be the compounds of this type which will be more commonly employed commercially in stabilizing polyvinyl acetal resins in accordance with my invention. The following example illustrates a stabilization with varying quantities of vanillin:

To each of five solutions of 525 parts of polyvinyl acetate in an excess of ethyl alcohol, a mixture of 76 parts of paraldehyde and 37.5 parts of concentrated hydrochloric acid was added. Vanillin was added to the respective solutions in the following amounts:

A ---- 1.3 parts     C ---- 5.2 parts
B ---- 2.6 parts     D ---- 10.4 parts
         E ---- 15.6 parts In each case the vanillin was added after first dissolving in 75 grams of alcohol. The reaction mixture was left seven days at 40° C. and was then precipitated into water, washed and dried and its viscosity stability determined. The results were as follows:

|   | Mol percent of vanillin | Viscosity of 5-percent solution in acetic acid before heating | Viscosity of 5-percent solution in acetic acid after heating for 24 hrs. at 110° C. |
|---|---|---|---|
| -A | 0.5 ( 1.3 parts) | 147.6 | 106.3 |
| -B | 1.0 ( 2.6 parts) | 140.3 | 116.2 |
| -C | 2.0 ( 5.2 parts) | 144.2 | 122.0 |
| -D | 4.0 (10.4 parts) | 139.6 | 119.4 |
| -E | 6.0 (15.6 parts) | 146.9 | 126.5 |

In the case of piperonal, the corresponding mol percents were added to a similar reaction mixture with the following results:

|   | Mol per cent of piperonal | Viscosity before heating | Viscosity after heating for 24 hrs. at 110° C. |
|---|---|---|---|
| -A | 0.5 | 124.6 | 80.8 |
| -B | 1.0 | 120.6 | 87.9 |
| -C | 3.0 | 120.6 | 85.3 |
| -D | 5.0 | 129.9 | 128.2 |

A series of polyvinyl acetal resins were prepared using resorcyl aldehydes in the reaction mixture with the following results:

|   | Mol per cent of resorcyl aldehyde | Viscosity before heating | Viscosity after heating for 24 hrs. at 110° C. |
|---|---|---|---|
| -A | 0.4 | 119.7 | 95.2 |
| -B | 0.8 | 135.2 | 126.5 |

Polyvinyl acetal resins were also prepared employing gentisinic aldehyde, protocatechuic aldehyde and 3,4 methylene dioxy-dihydro-atropic aldehyde with the following results:

|   | Mol. per cent |   | Viscosity before heating | Viscosity after heating for 24 hrs. at 110° C. |
|---|---|---|---|---|
| -A | 0.5 | Gentisinic aldehyde | 148.9 | 138.4 |
| -B | 1.0 |  | 122.0 | 129.9 |
|  | 5.0 | Protocatechuic aldehyde | 151.5 | 134.4 |
| -A | 0.5 | 3, 4 methylenedioxy - dihydroatropic aldehyde | 139.0 | 131.2 |
| -B | 2.0 |  | 119.4 | 110.0 |
| -C | 5.0 |  | 115.4 | 105.0 |

Polyvinyl acetaldehyde butyraldehyde acetal resins were prepared in which butyraldehyde was present in the reaction mixtures in addition to paraldehyde. Vanillin was present in the reaction mixtures in the amounts indicated in the following table. The results were:

|   | Mol. per cent of vanillin | Viscosity before heating | Viscosity after heating for 24 hrs. at 110° C. |
|---|---|---|---|
| -A | 0.5 | 105.0 | 55.8 |
| -B | 2.0 | 108 | 103 |
| -C | 4.0 | 108 | 101.5 |

The compounds mentioned are representative of the dihydroxy aromatic aldehydes or the compounds which will form dihydroxy aromatic aldehydes in the reaction mixture and make up a substantial proportion of the compounds which come under this classification. Any of the alkylene dioxy-aromatic aldehydes, which will be useful in stabilizing in accordance with my process, are those which may be classified as methylene dioxy-benzaldehydes, piperonal being the common representative of that class of compounds.

A series of polyvinyl acetal resins were prepared following the first example only using p-dimethyl amino benzaldehyde instead of vanillin. The results were as follows:

|   | Mol percent of p dimethyl aminobenzaldehyde | Viscosity before heating | Viscosity after heating for 24 hrs. at 100° C. |
|---|---|---|---|
| A | 0.5 | 112.8 | 106.2 |
| B | 1.0 | 112.5 | 99.0 |
| C | 3.0 | 110.9 | 115.4 |
| D | 5.0 | 106.2 | 105.9 |

The following resins are exemplary of those which may be stabilized in accordance with my invention. It is to be understood that this list is not limiting but illustrative.

Polyvinyl acetate and other esters
Polyvinyl co-polymers (polyvinyl chloride-acetate)
Polyvinyl acetaldehyde acetal
Polyvinyl formaldehyde acetal
Polyvinyl propionaldehyde acetal
Polyvinyl butyraldehyde acetal Mixed polyvinyl acetals such as:
   Polyvinyl formaldehyde-acetaldehyde acetal
   Polyvinyl butyraldehyde-acetaldehyde acetal
   Polyvinyl benzaldehyde-acetaldehyde acetal
   Polyvinyl furfuraldehyde-acetaldehyde acetal
   Polyvinyl acetone acetaldehyde ketacetal
   Polyvinyl cyclohexanone acetaldehyde ketacetal The polyvinyl acetal resins, stabilized by my process, are particularly suitable for the preparation of photographic film or any other commercial product where the transmission of light is an important factor. Another instance of such a use is as an intermediate layer in the making of laminated or "safety" glass. These stabilized resins may, also, be employed for making artificial yarn, lacquers, molding compositions, impregnated textiles or laminated products. For instance, sheets of these stabilized resins may be laminated with layers of wood, metal, paper, glass, cellulose ester, etc. These stabilized resins may be employed for electrical insulation, especially where the insulated material, such as wire, is subjected to movement or bending. In some instances it may be found desirable to mix these stabilized polyvinyl resins with other plastic materials, such as cellulose acetate, acetate propionate or acetate butyrate; cellulose ethers, such as ethyl cellulose, gums, other resins, either natural or synthetic, waxes and oils.

Partial polyvinyl acetal resins may be stabilized in accordance with my invention. For example, if a polyvinyl butyraldehyde acetal resin, made by condensing butyraldehyde with polyvinyl alcohol according to French Patent No. 792,661 of Carbide and Chemicals Corporation in which from about 2.5 to about 4 molecules of polyvinyl alcohol are combined with each molecule of butyraldehyde, is subjected to the action of a stabilizing aldehyde in accordance with my invention, a stable acetal resin results which is especially adapted to use for preparing an intermediate layer in the making of laminated glass.

As explained above, the compounds which are employed in accordance with my invention are those having an aldehyde group attached to a structure or group which will act as a stabilizer of polyvinyl acetal resins. As pointed out by Hale in his application Serial No. 129,248 filed March 5, 1937, the dihydroxy benzenes and the amines are both recognized as good stabilizers of polyvinyl resins. Any other compound containing an aldehyde group, providing some or all of the other portion of the compound has stabilizing properties, may be employed in accordance with my invention.

The compounds resulting from combining aromatic amines with an aldehyde group (unless there was some reason such a combination could not be effected) are effective stabilizers in accordance with my invention.

I claim:

1. The process of preparing a stable polyvinyl acetal resin which comprises mixing together a polyvinyl fatty acid ester with an aldehyde under conditions which will result in the formation of a polyvinyl acetal in the presence of a compound selected from the group consisting of the aminobenzaldehydes, the dihydroxy aromatic aldehydes in which not more than one of the hydroxyls has its hydrogen replaced and the compounds which will generate dihydroxy aromatic aldehydes in a polyvinyl acetal reaction mixture.

2. The process of preparing a stable polyvinyl acetal resin which comprises mixing together polyvinyl acetate with an aldehyde under conditions which will result in the formation of a polyvinyl acetal in the presence of an amino benzaldehyde.

3. The process of preparing a stable polyvinyl acetal resin which comprises mixing together polyvinyl acetate with an aldehyde under conditions which will result in the formation of a polyvinyl acetal in the presence of an alkylene dioxy aromatic aldehyde.

4. The process of preparing a stable polyvinyl acetal resin which comprises mixing together polyvinyl acetate with an aldehyde under conditions which will result in the formation of a polyvinyl acetal in the presence of a dihydroxy aromatic aldehyde in which not more than one of the hydroxyls has its hydrogen replaced.

5. The process of preparing a stable polyvinyl acetal resin which comprises mixing together polyvinyl acetate with a reaction mixture containing acetaldehyde under conditions which will result in the formation of a polyvinyl acetal in the presence of a compound selected from the group consisting of the amino benzaldehydes, the dihydroxy aromatic aldehydes in which not more than one of the hydroxyls has its hydrogen replaced and the compounds which will generate dihydroxy aromatic aldehydes in a polyvinyl acetal reaction mixture.

6. The process of preparing a stable polyvinyl acetal resin which comprises mixing together a polyvinyl intermediate selected from the group consisting of polyvinyl fatty acid esters and polyvinyl alcohol with a reaction mixture containing an aliphatic aldehyde under conditions which will result in the formation of a polyvinyl acetal and a dihydroxy aromatic aldehyde, one of the hydroxyls having its hydrogen replaced by a group selected from the groups consisting of alkyl and alkacyl.

7. The process of preparing a stable polyvinyl acetal resin which comprises reacting upon a polyvinyl intermediate selected from the group consisting of polyvinyl fatty acid esters and polyvinyl alcohol with a reaction mixture containing an aliphatic aldehyde and an alkylene dioxy aromatic aldehyde.

8. The process of preparing a stable polyvinyl acetal resin which comprises reacting upon a polyvinyl intermediate selected from the group consisting of polyvinyl fatty acid esters and polyvinyl alcohol with a reaction mixture containing an aliphatic aldehyde and a methylene dioxy aromatic aldehyde.

9. The process of preparing a stable polyvinyl acetal resin which comprises mixing together a polyvinyl intermediate selected from the group consisting of polyvinyl fatty acid esters and polyvinyl alcohol with a reaction mixture containing an aliphatic aldehyde under conditions which will result in the formation of a polyvinyl acetal and a dialkyl amino benzaldehyde.

10. The process of preparing a stable polyvinyl acetal resin which comprises mixing together a polyvinyl fatty acid ester with a reaction mixture containing an aliphatic aldehyde under conditions which will result in the formation of a polyvinyl acetal and vanillin.

11. The process of preparing a stable polyvinyl acetal resin which comprises mixing together a polyvinyl acetate with a reaction mixture containing an acetaldehyde under conditions which will result in the formation of a polyvinyl acetal and vanillin.

12. The process of preparing a stable polyvinyl acetal resin which comprises mixing together a polyvinyl fatty acid ester with a reaction mixture containing an aliphatic aldehyde under conditions which will result in the formation of a polyvinyl acetal and piperonal.

13. The process of preparing a stable polyvinyl acetal resin which comprises mixing together polyvinyl acetate with a reaction mixture containing an acetaldehyde under conditions which will result in the formation of a polyvinyl acetal and piperonal.

14. The process of preparing a stable polyvinyl acetal resin which comprises mixing together a polyvinyl fatty acid ester with a reaction mixture containing an acetaldehyde under conditions which will result in the formation of a polyvinyl acetal and p-dimethyl amino benzaldehyde.

15. The process of preparing a stable polyvinyl acetal resin which comprises mixing together a polyvinyl fatty acid ester with a reaction mixture containing an aliphatic aldehyde under conditions which will result in the formation of a polyvinyl acetal, hydrochloric acid as the catalyst and a compound selected from the group consisting of the aminobenzaldehydes, the dihydroxy aromatic aldehydes in which not more than one of the hydroxyls has its hydrogen replaced and the compounds which will generate dihydroxy aromatic aldehydes in a polyvinyl acetal reaction mixture.

16. The process of preparing a stable polyvinyl acetal resin which comprises mixing together polyvinyl acetate with a reaction mixture containing an acetaldehyde under conditions which will result in the formation of a polyvinyl acetal, hydrochloric acid as the catalyst and a compound selected from the group consisting of the amino benzaldehydes, the dihydroxy aromatic aldehydes in which not more than one of the hydroxyls has its hydrogen replaced and the compounds which will generate dihydroxy aromatic aldehyde in a polyvinyl acetal reaction mixture.

17. The process of preparing a stable polyvinyl acetal resin which comprises mixing together a polyvinyl intermediate selected from the group consisting of polyvinyl acid esters and polyvinyl alcohol with a reaction mixture containing butyraldehyde under conditions which will result in the formation of a polyvinyl acetal and a compound selected from the group consisting of the aminobenzaldehydes, the dihydroxy aromatic aldehydes in which not more than one of the hydroxyls has its hydrogen replaced and the compounds which will generate dihydroxy aromatic aldehydes in a polyvinyl acetal reaction mixture.

18. A stable polyvinyl acetal resin resulting from the interaction of polyvinyl acetate with an aliphatic aldehyde and a compound selected from the group consisting of the aminobenzaldehydes, the dihydroxy aromatic aldehydes in which not more than one of the hydroxyls has its hydrogen replaced and the compounds which will generate dihydroxy aromatic aldehydes in the polyvinyl acetal reaction mixture.

19. A stable polyvinyl acetal resin resulting from the interaction of a polyvinyl fatty acid ester with an aliphatic aldehyde and vanillin.

20. A stable polyvinyl acetal resin resulting from the interaction of a polyvinyl fatty acid ester with an aliphatic aldehyde and piperonal.

G. BRYANT BACHMAN.

CERTIFICATE OF CORRECTION.

Patent No. 2,186,598. January 9, 1940.

GUSTAVE BRYANT BACHMAN.

It is hereby certified that error appears in the printed specification of the above numbered patent requiring correction as follows: Page 4, second column, line 4, claim 17, before the word "acid" insert fatty; and that the said Letters Patent should be read with this correction therein that the same may conform to the record of the case in the Patent Office.

Signed and sealed this 9th day of April, A. D. 1940.

(Seal)

Henry Van Arsdale,
Acting Commissioner of Patents.